Figure 1:
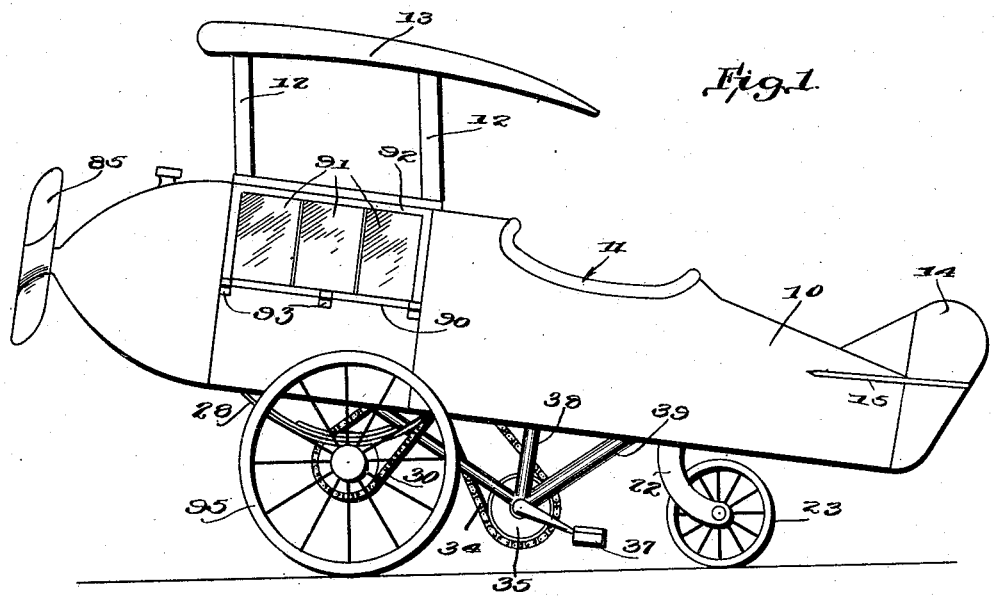

May 13, 1930.　　　J. T. CROW　　　1,758,432
VENDING MACHINE
Filed Sept. 13, 1928　　　2 Sheets-Sheet 1

WITNESSES
C.B.Shillinger

INVENTOR
James T. Crow
BY
Munn & Co.
ATTORNEY

May 13, 1930. J. T. CROW 1,758,432
VENDING MACHINE
Filed Sept. 13, 1928   2 Sheets-Sheet 2

WITNESSES
C. B. Shillinger

INVENTOR
James T. Crow
BY
Munn & Co.
ATTORNEY

Patented May 13, 1930

1,758,432

UNITED STATES PATENT OFFICE

JAMES THOMAS CROW, OF ARKADELPHIA, ARKANSAS

VENDING MACHINE

Application filed September 13, 1928. Serial No. 305,816.

This invention relates to a vehicle in the shape of an airplane for the display and selling of commodities.

An object of the invention is the provision of a vehicle adapted to be manually propelled through a mechanical connection with supporting wheels of the vehicle, the body of the vehicle being in the shape of an airplane having storage space for commodities and a seat for the operator incorporated in the body.

Another object of the invention is the provision of a vehicle in the shape of an airplane which is adapted to be manually propelled and in which a clutch mechanism is employed for cutting off the power to one of the wheels when the vehicle is propelled around a corner.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claim.

In the drawings:—

Figure 2:
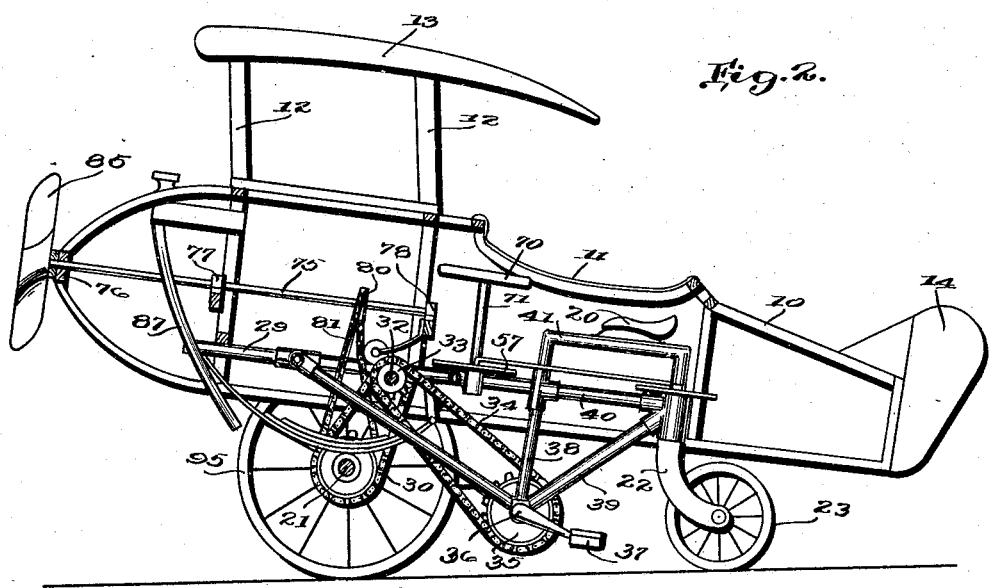
Figure 3:
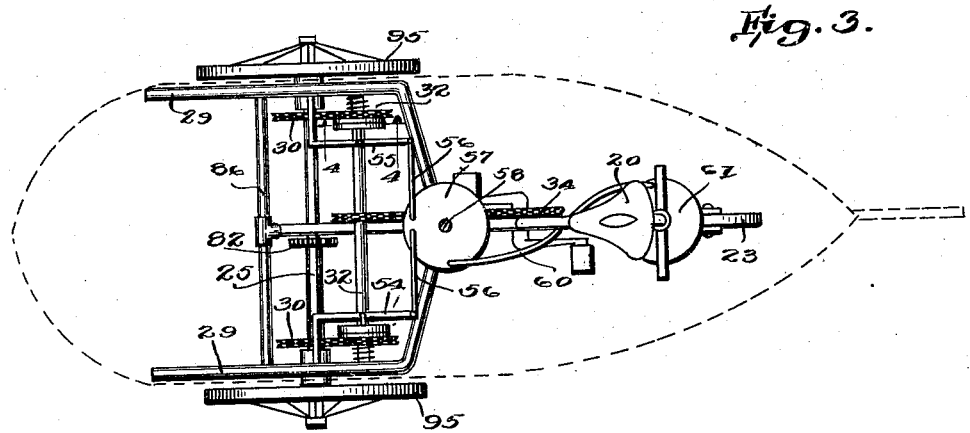
Figures 4, 5:
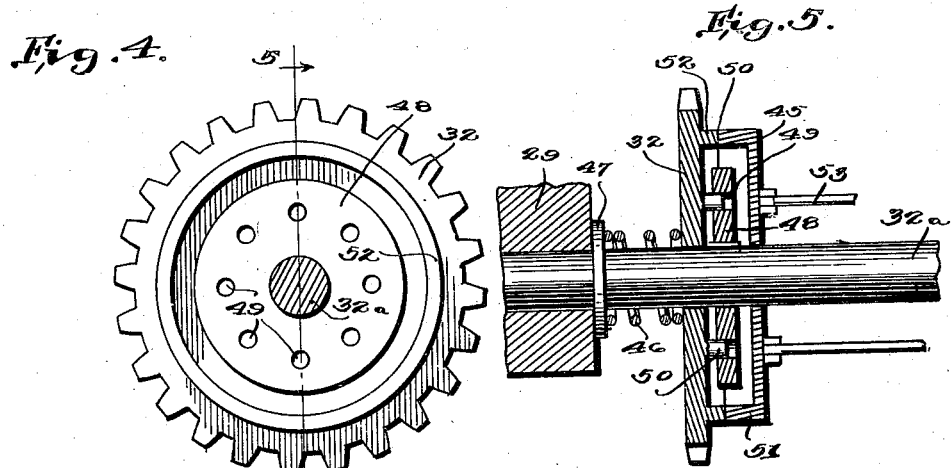
Figure 6:
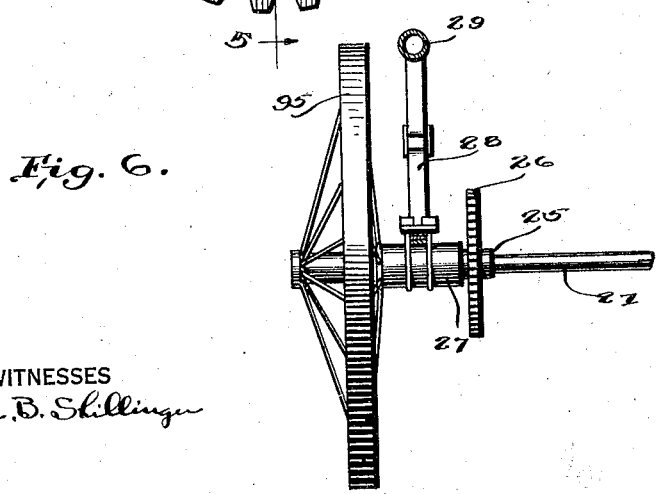

Figure 1 is a longitudinal view of a vehicle constructed according to the principles of my invention, Figure 2 is a longitudinal vertical section of the vehicle, Figure 3 is a plan view of the propelling mechanism, Figure 4 is a transverse vertical section taken on the line 4—4 of Fig. 3, Figure 5 is a vertical section taken along the line 5—5 of Fig. 4, Figure 6 is a fragmentary plan view of a traction wheel and its associated bearings.

Referring more particularly to the drawings 10 designates a body in the shape of a fuselage of an airplane having an opening 11 at the top thereof providing a cockpit to receive the operator of the vehicle. Staves 12 extend upwardly from the forward end of the body and upon which is mounted a top 13 extending partially over the opening 11 and designed to designate a wing of an airplane. The rear end of the body is provided with a relatively stiff piece of material 14 representing a rudder from opposite sides of which extend members 15 representing elevators.

The supporting structure is located within the body 10 and rigidly connected thereto forming a frame-work for supporting a seat 20, an axle 21 and a fork 22, which in turn is supported by a wheel 23.

A pair of sleeves 25 are rotatably mounted on the axle 21 at the opposite ends thereof and a sprocket 26 is rigidly attached to each sleeve. A second sleeve 27 is mounted on the sleeve 25 to which is secured the intermediate portion of a spring 28 which has its opposite ends connected to the bars 29 of the frame work.

A chain 30 is trained over each sprocket 26 and a sprocket 31 loosely mounted on a shaft 32 extending transversely of the body. The shaft 32 is driven by a sprocket 33 which is rigid therewith, the sprocket in turn being driven by a chain 34 and a sprocket 35. The sprocket 35 is driven by a shaft 36 which in turn is operated by pedals 37. The shaft 36 is supported in bearings carried by brace bars 38 and 39 which are connected together by a transverse bar 40 and a bar 41 forming a support for the seat 20.

Each sprocket 32 as has been explained, is slidable on the shaft and is urged towards a cup-shaped member 45 by means of a spring 46 located between the disc 47 and the sprocket 32. The cup-shaped member has a central disc 48 having passages 49 adapted to receive pins 50 projecting from one face of the sprocket 32. The flange 51 of the cup-shaped member 45 is adapted to align and be in engagement with an annular flange 52 of a sprocket 32.

A yoke indicated at 53 is connected with the cup-shaped member 45 and either one of a pair of arms 54 or 55 and links 56, respectively, connect the arms 54 and 55 with a disc 57 secured to a steering post 58.

A link 60 connects the disc 57 adjacent the periphery thereof to a disc 61 and at a point on the disc 61 which is diametrically opposite to the point where the link is connected to the disc 57. The disc 61 is rigid with the fork 22 so that rotation of the steering wheel 70 will cause oscillation of the wheel 23 and the release of one of the clutch elements designated by the disc 48 and the pins 50. The steering wheel 70 is secured to a post 71 which in turn is rigid with the disc 57.

A shaft 75 is mounted in bearings 76, 77 and 78 carried by the body 10 and has a sprocket 80 rigidly connected thereto over which is trained a chain 81. The chain also is trained over a sprocket 82 rigid with the extension of the sleeve 25 so that rotation of the sprocket 26 will cause rotation of the shaft 75 and likewise the propeller 85. A brake bar 86 connects the rods 29 together and a reinforcing bar 87 connected with the bar 86.

The portion of the body as indicated at 90 is cut away and a plurality of compartments are formed therein which have transparent closures at the outer end as shown at 91 so that prospective customers may view the articles stored within the compartments in the body. The closures 91 are supported within a frame 92 which is hinged at 93 to the body 10.

The operation of my device is as follows: When the pedals 37 are actuated and the shaft 36 is revolved causing the chain 34 to drive the shaft 32ª, and likewise the sprockets 32, the spring 46 normally maintains the sprockets in close association with the cup-shaped member 45 whereby the pins 50 are engaged in the recess 49 in the disc 48. These sprockets in turn, through the chains 30, drive the sprockets 26 and likewise the traction wheels 95, which are rigid with the sleeves 25. The shaft 75 is also revolved when the sleeves 25 are revolved causing rotation of the propeller 85. When the operator of the car desires to turn a corner and revolves the steering wheels 70, one of the clutch members 48 will be moved away from the sprocket 32 so that said sprocket will not be driven by the shaft 32. In other words when the operator of the car turns the car to the right, the right wheel will become inoperative while the left wheel is being revolved, and vice versa. The rotation of the steering wheel 70 also causes oscillation of the fork 22 and likewise the wheel 23 for aiding the operator in turning the corner.

I claim:—

A vehicle comprising an elongated hollow body in the shape of the fuselage of an airplane, a frame connected with the body and located partly within and without the body, traction wheels carried by the frame, a steering wheel carried by the frame for supporting the rear end of the body, means for manually revolving the traction wheels whereby the body is propelled, means interpolated in the manual means for releasing a traction wheel from the manual means, means for controlling the steering wheel, and means operatively connecting the steering means with the releasing means so that when the steering means is actuated one of the releasing means will disconnect a traction wheel from the driving connection.

JAMES THOMAS CROW.